Feb. 6, 1962   J. H. FORKNER   3,020,164
FOOD PRODUCT AND METHOD OF MANUFACTURE
Filed April 7, 1960
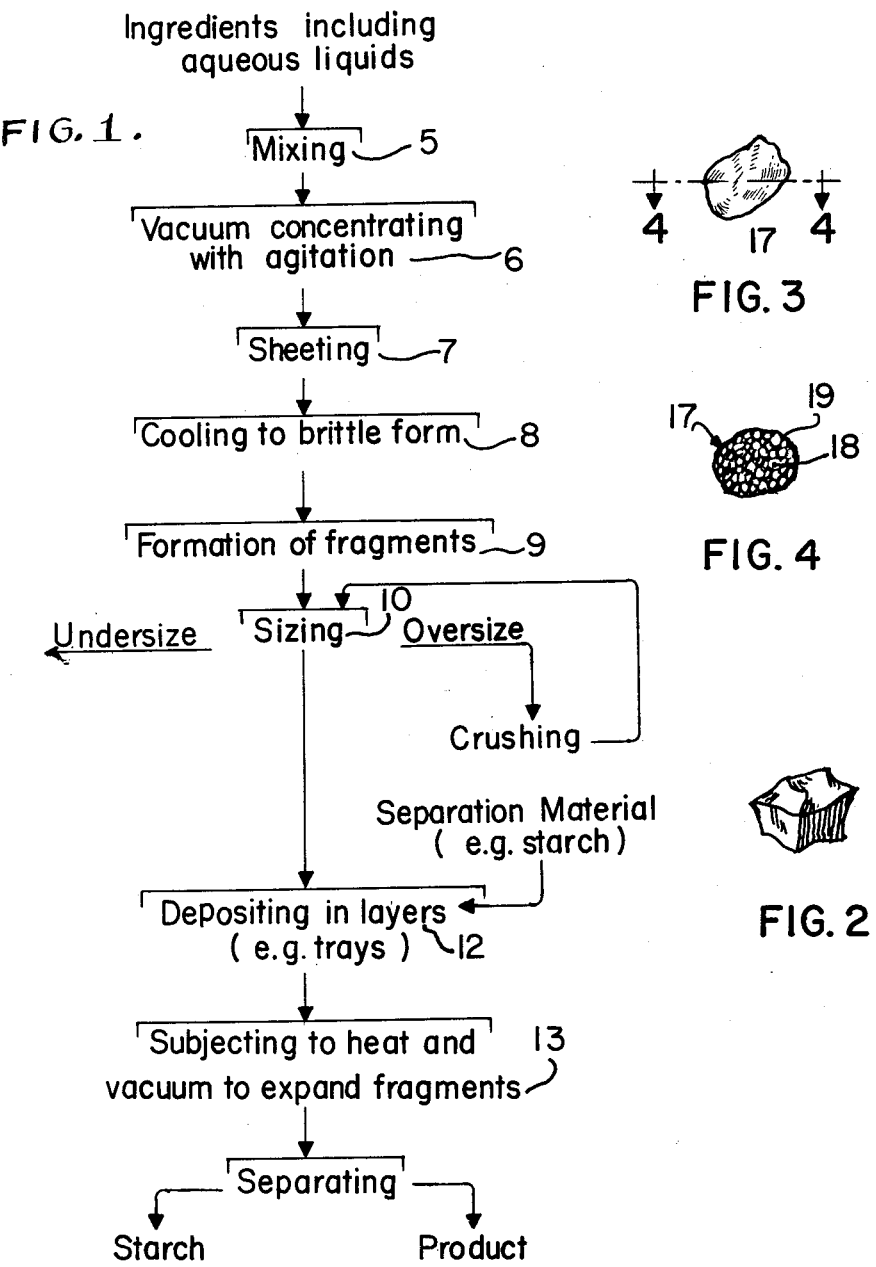
INVENTOR
JOHN H. FORKNER
ATTORNEYS

3,020,164
FOOD PRODUCT AND METHOD OF MANUFACTURE

John H. Forkner, Fresno, Calif., assignor to The Pillsbury Company, Minneapolis, Minn., a corporation of Delaware
Filed Apr. 7, 1960, Ser. No. 20,729
31 Claims. (Cl. 99—134)

This invention relates generally to edible products for incorporation in moist bakery or confection items, to bakery or confection products resulting therefrom, and to methods for manufacturing the same.

In many types of bakery or confection products, it is desirable to add solid fragments having a fruity or other high flavoring. A product of this character is disclosed in my Patent 2,650,881, and is in the form of solid crystal-like fragments. When incorporated in a moist dough mix, the fragments absorb moisture with expansion to form jelly-like masses. Such a product has characteristics which limit its application. Particularly the density of the masses is relatively high, which affects their distribution in moist bakery or confection mixes. Absorption of moisture when placed in a moist mix is relatively slow, and in the final bakery product the masses tend to be harder or tougher than is desired for optimum palatability and ease of cutting. Expansion during moisture absorption tends to cause some diffusion into the adjacent portions of the surrounding material, thus affording an unattractive appearance. When surfaces of the masses are exposed, there is a tendency toward discoloration and burning during baking. Manufacturing cost, for a given distribution in a bakery product, is relatively high.

In general it is an object of the present invention to provide a new edible article of manufacture (i.e. food product) in the form of small masses which have a fruity or other high flavor, and which are particularly adapted for incorporation in moist bakery or confection products.

Another object of the invention is to provide a food product of the above character which possesses the property of absorbing water to form stable gel-like material, without material change in volume.

Another object of the invention is to provide an article of manufacture of the above character which is relatively light in weight, and which is well adapted for incorporation in a variety of moist bakery and confection mixes.

Another object of the invention is to provide small spherical shaped fragments of high flavoring which absorb moisture at a controlled rate, with eventual conversion of the mass into a solid gel, whereby when incorporated in a bakery or confection product, the masses of gel are present in the finished product in substantially the same volume as the original masses.

Another object of the invention is to provide a food product of the type described above which becomes tender when incorporated in bakery products, and which is better able to withstand exposure without discoloration or burning.

Another object of the invention is to provide a food product of the type described above, having novel properties including generally spherical shaped masses each having a porous sponge-like interior and a smooth relatively hard exterior, with the interior possessing the property of rapidly absorbing water, and with the outer surface forming an integral shell or skin tending to retard penetration of water when initially wet, as when mixing in and working with a batter or dough, but which after such initial period rapidly and completely hydrates during baking.

Another object of the invention is to provide a new food product of the general character described above which when mechanically intermixed with a cake batter or like wet mix, is not crushed or dispersed to any substantial extent.

Another object of the invention is to provide a product of the general character described above, which has a gel-forming agent that is activated by contact with one or more agents carried in the wet mix in which the product is introduced.

Another object of the invention is to provide a novel method of manufacturing my new article of manufacture.

Another object of the invention is to provide new bakery and confection products, characterized by the use of my novel product.

Additional features and objects of the invention will appear from the following description in which the preferred embodiments have been set forth in detail in conjunction with the accompanying drawing.

Referring to the drawing:

FIGURE 1 is a flow sheet illustrating one method for manufacturing my food product;

FIGURE 2 is a perspective view illustrating a typical fragment before expansion;

FIGURE 3 is a perspective view illustrating one of the masses made by the method of FIGURE 1;

FIGURE 4 is an enlarged cross-sectional view taken along the line 3—3 of FIGURE 3.

In general products made in accordance with the present invention are in the form of small masses that are generall spherical in shape. Each mass has a porous sponge-like interior, and a substantially unbroken and relatively impervious exterior surface or skin. The ingredients from which the masses are formed are such that when introduced into a moist bakery or confection mix, controlled penetration of moisture occurs through the outer surfaces and into the pores of the masses, with transformation of the masses into solid gel-like masses of the same volume. In other words moisture absorption and transformation into solid gel occurs without any substantial amount of contraction or expansion, and such transformation occurs over a substantial period of time comparable to that required to prepare a wet cake mix, and to subject the same to conventional baking.

My product differs in many respects from conventional vacuum expanded confection balls or spheres such as so-called malted milk balls. As a typical example, the size of such confection balls may be such that one pound will comprise from about 180 to 270 pieces each having a size ranging from about ½ to 1½ inches (average diameter), whereas in a typical instance my product comprises more than 200 pieces per pound, and preferably from about 8,000 to 15,000 pieces per pound, with the major part of the masses having a size ranging from about 1/32 to 3/16 inch (average diameter). For certain uses, my product can be made in pieces substantially smaller than 10,000 to the pound, as for example, as many as 100,000 or more pieces. Typical malted milk balls have a specific gravity of the order of 0.22, while a typical product made in accordance with the present invention, has a density of the order of 0.63. Expanded confection balls or malted milk balls have relatively little inherent strength to resist crushing. Therefore they are subject to rapid mechanical disintegration when intermixed in a typical cake mix, wet dough or batter. Absorption of moisture during preliminary mixing rapidly reduces the little inherent strength of such material, whereby before the mixing is completed, the strength to resist crushing has been reduced to substantially zero. Therefore assuming that one should attempt to intermix malted milk balls with a wet cake batter of conventional formulation, substantially complete disintegration occurs in a period of the order of one minute, which is a shorter period than is required for mechanical mixing. Therefore in the final finished cake, there will be substantially no residual discrete masses except some undispersed portions of the original malted milk balls. In contrast, my produce possesses inherent strength to resist crushing, and although there is some reduction in strength as moisture is absorbed, the product can be intermixed with a conventional wet cake mix without any substantial mechanical crushing, and at the end of the baking period, the finished product has discrete gel-like masses directly identifiable with the original dry product. Actual tests have shown that in a typical cake mix, the masses of my product retain their original identity and considerable strength after a period of seven minutes, which is ample working time for making, depositing, and placing in an oven.

The flow sheet of FIGURE 1 illustrates one procedure for making my product. In step 5 certain ingredients are intermixed, including material having the desired flavoring, and a gel-forming agent or stabilizer. The flavoring material may be a natural fruit-like material such as a fresh fruit or berry in the form of a pulp or a juice, artificial flavoring materials, or both. As will presently be explained in greater detail, one gel-forming agent that can be used with good results, is low methoxyl pectin. The temperature of the ingredients in step 5 may be somewhat higher than room, but below 212° F., as for example from 110 to 180° F. This warm mix is then supplied to the vacuum concentrating operation 6, where the material is continuously agitated while being concentrated by vacuum evaporation. Either during evaporation or while the material is being supplied to this step, a reducing sugar is added, such as reducing sugar syrup (e.g. glucose). Evaporation is continued until a solids concentration is attained that is suitable for further treatment, such as a concentration of the order of 85%.

In the next operation 7, the warm material from the concentration operation 6 is processed to form sheets or like masses of predetermined thickness. This can be carried out by the use of conventional sheeting mills of the roll type which form the material into sheets of the desired thickness. These sheets preferably are sliced into slabs, strips or bars which are convenient for further processing.

In the next step 8 the sheets or slabs are cooled to produce a hard mass. Thereafter in step 9 this hard mass is divided into small pieces of fragments, as by means of cracking or slicing. Sizing is applied at 10 whereby oversize and undersize fragments are removed. Such a sizing operation can be carried out by screening. By way of example, oversized fragments remaining upon a No. 3 screen can be rejected, and also undersized fines passing through a No. 8 screen. Undersized fines can be returned to the process, as for example to the mixing step 5.

The sized fragments from step 10 are supplied to step 12, where they are intermixed with a dry divided (i.e. discrete) supporting and separating medium, such as starch, and deposited as a layer upon drying trays together with the separating medium. The volume of starch or other separating medium used preferably is about the same as the volume of fragments, thereby providing a bed in which the fragments may expand without crowding against each other. For example it is satisfactory to use 10 parts (by weight) of fragments, to 90 parts of starch. However other ratios can be used ranging from two parts fragments to one part starch, to one part fragments to twenty parts starch. In general as the percentage of solids in the fragments is increased, the amount of starch employed may be reduced. Other factors being the same, larger amounts of starch tend to cause the masses to expand to truer spheres. The layers deposited in the drying trays (i.e. fragments together with starch or other separating medium) may in practice range from ½ to 2 inches in thickness.

In step 13 the contents of the trays are subjected to heating and application of a vacuum. It is satisfactory to carry out this operation in a vacuum dehydrator of the type provided with shelves heated by circulated hot water at atmospheric pressure. In such a dehydrator the trays can be heated to a temperature of the order of 140 to 200° F. with application of a vacuum of the order of 27 to 29.5 inches mercury column or higher. Higher temperatures (e.g. 240° F.) can be used by employing a heating medium like steam under pressure, thus facilitating the rapid attainment of a lower moisture content in the final product. However care should be taken to avoid such elevated temperatures as might cause melting of the masses.

Prior to step 13, the fragments are characterized by flat planar surfaces and sharp edges and corners as the result of cracking or otherwise fragmenting the hard material. Such a fragment is shown in FIGURE 2. However during step 13 the small solid fragments are expanded to form generally spherical shaped masses 17 such as shown in FIGURES 3 and 4, each mass having a smooth and substantially unbroken outer surface or skin 18 and a porous sponge-like interior 19. Thus during expansion the flat surfaces are founded and the sharp edges and corners disappear.

The expansion may serve to increase the average diameter of the masses from about 15 to 30%, thereby obtaining a volume increase of from about 50 to 200% (optimum about 100%). Expansion is accompanied by some moisture removal whereby the final product has a moisture content of the order of from 1 to 5%.

Before removal from the vacuum chamber it is desirable to harden the product by cooling, particularly where the moisture content for a given degree of expansion is such that the product might otherwise tend to collapse. This can be carried out by circulating cold water through the shelves immediately before the vacuum is broken and the trays removed, whereby the trays are cooled to say 120 to 80° F. Such procedure makes possible an optimum degree of expansion.

In step 14 the starch and remaining fines are separated from the expanded masses, as by screening, to leave the desired end product. In practice the starch and fines will pass through a No. 12 screen. Some undesired fines remaining with the starch can be removed as by further screening, and returned to step 5.

The desired expansion in step 13 is made possible by the use of a reducing sugar, such as glucose, dextrins and maltose. Maltose together with one or more other reducing sugars has given good results. Varying amounts of maltose and other reducing sugars are supplied by using commercial corn sugar, corn syrup (as in the formulation described above), malt syrup, glycose, or mixtures of the same. Frequently it is desirable to employ some additional sweetening, such as sucrose, although the major portion of the sugar employed preferably is of the type mentioned above. An increase in the amount of sucrose employed reduces the extent of expansion in step 13, and may produce a harder mass than is desirable for certain purposes, such as a layer cake.

Reference has been made to the use of low methoxyl pectin as a gel-forming or stabilizing agent. Commercial pectins of this type that are available have a methoxyl content of not more than about 7%. They are generally classed as lower ester pectins, and are characterized by calcium ion sensitivity. Also they are compatible with many acidic materials, such lower ester pectins are manufactured by partial deesterification by enzymatic action, and by ammonia and alcoholic systems. The presence of low methoxyl pectin, as distinguished from other gel-forming or stabilizing agents (including the moisture absorbent agent hereinafter described), is desirable in that it does not tend to cause setting or thickening during the various processing operations described above, and it is not critical with respect to pH. Ordinary pectin would tend to cause the mix to thicken or set up as a gel, in the operations 5 to 8, with the result that the fragments would not properly expand to the desired form in operation 13. Also it is relatively critical as to pH. With the use of low methoxy pectin as a gel-forming agent, good expansion can be obtained in the operation 13, and when expanded masses are introduced into a wet mix, such as a cake, cookie or pancake batter or dough, with hydration of the masses occurring during mixing and subsequent baking, the low methoxyl pectin causes the material to set up as a gel by contact with calcium ion contained in the moist mix. If formation of a gel does not take place or is not completed before baking, it is accelerated by the elevated baking temperatures. Many cake, cookie, pancake and like mixes contain sufficient calcium ion to cause such setting. Calcium ion can be provided by introducing small amounts of calcium salt, such as calcium chloride, or by including ingredients in the mix which contain small amounts of soluble calcium salts, such as milk solids.

Instead of employing low methyl pectin as a gel forming or stabilizing agent, it is possible to employ in the mix a moisture absorbent edible stabilizer, and an edible body imparting material such as milk protein or casein. The edible stabilizer should be such that it does not tend to set as a gel in steps 5 to 13. However, when its contacts absorbs moisture, as in cake mix, it should form together with the other ingredients of the mix, a stable gel-like mass having sufficient body whereby it is capable of retaining its identity in the completed bakery or confection product. Various materials have been used for this purpose, including pregelatinized (i.e. precooked) starch, and finely divided edible cellulose. The starch may be of a type having a substantial amount of dextrin, as, for example, starches partially broken down by boiling with mineral acid. As a suitable edible cellulose, reference can be made to methyl cellulose, and substantially oil-free coconut of the type disclosed in my Patent 2,272,990. Such materials will provide the desired gel-like form at room temperature, and they are not critical with respect to pH or specific formulation (e.g. the presence or proportioning of certain types of sugars, the presence of acids, etc.).

The use of milk protein or casein referred to in the foregoing paragraph tends to provide body and enhances the ability of the mix to expand in step 13 and, in general, it offsets the tendency of the stabilizer to retard expansion. In this connection such glue-like material probably functions to aid in maintaining the walls of the expanding inner cells, and to impart hardness and strength to both the sponge-like interior and the outer skin of the final expanded product which at the same time it hydrates together with the starch, cellulose or like stabilizer.

Commercial spray dried milk powder (edible grade) contains substantial amounts of soluble milk protein. By virtue of the temperatures involved, denaturing of such milk protein occurs during processing without impairing its ability to hydrate. Likewise, when my product (with a milk protein content) is incorporated in a baking dough or batter and the mix subjected to baking, some further denaturing of the milk protein occurs without interfering with moisture absorption or the existence of the protein dispersed as a colloid in the gel-like mass. Malted milk powder can be used to supply part or all of such material, particularly because of its milk protein content. Other edible protein capable of hydration in substantially the same manner as milk protein can be used, such as soybean protein.

As previously mentioned, the material is taken from the mixing step 5 at an elevated temperature, which may vary somewhat in accordance with formulation. Where the formulation employed includes low methoxyl pectin as a gel-forming agent, the working temperature may range from 110 to 180° F., as previously stated. Where the formulation contains a moisture-absorbing agent like pre-gelatinized starch, the working temperature may be of the order of from 110 to 125° F.

The thickness of the sheets produced in step 7 can be in accordance with the dimensions required for the fragments supplied to step 13. For example, sheets about 5/16 inch thick are satisfactory where it is desired to produce fragments having a comparable maximum dimension. Cooling in step 8 serves to make the material hard or brittle and in good condition for cutting or cracking without sticking to the cutting or cracking knives. For example, the sheets may come from step 7 to a temperature above about 90° F. When cooled to about 60° F. or lower, the sheets become hard and brittle. Considerable time is required for cooling of the sheets if left exposed to normal room temperature, and during this time they may stick together or to surfaces on which they are deposited. Therefore, it is desirable to cool the sheets rapidly, whereby they are rapidly converted into a hard, brittle and non-sticky state. Rapid cooling can be carried out by placing the sheets in a refrigerated space at a low temperature, as for example, a temperature of the order of 0 to 20° F. The resulting frozen slabs can be handled in further operations without becoming sticky.

Step 9 can be carried out by passing the brittle material through a mill of the Fitzpatrick type having slicing knives rotating at 1800 r.p.m., with a ½ inch screen. With slabs of the thickness mentioned above, about 75% of the cracked fragments will remain on a No. 8 screen, and pass through a No. 3 screen. Such fragments are within desirable size limits.

Instead of a rolling operation, the material from step 6 can be subjected to various extruding operations, and the resulting strips or other extruded shapes cooled and subdivided.

Various materials can be used in place of starch in operation 13. Particularly, any material can be employed which retains the fragments separated from each other to prevent sticking, and which is of such a divided (i.e. discrete) character as to permit the fragments to expand when heated and subjected to a vacuum period. The medium should not detrimentally affect the masses with respect to form or flavoring, and it should be capable of ready separation from the expanded masses, as by screening. It may be reused until seriously contaminated with fines. In addition to starch, I can employ other finely divided materials which do not melt at the temperature of treatment, but remain substantially inert, such as farinaceous material and sugar. In general the heat conductivity of low bulk density farinaceous materials is not as good as starch.

In some instances it is desirable to aerate the material before forming it into sheets or slabs. This can be accomplished by the use of a suitable whipping agent (e.g. albumin), together with a whipping operation. Aerated materials afford more expansion and more tender products.

The general physical character of my product has been described above with reference to FIGURES 3 and 4. With reference to the mechanism involved in moisture absorption, it may be explained that irrespective of the specific ingredients employed, the product is sufficiently stable with respect to atmospheric moisture that it may be packaged in conventional moisture-proof cartons or packs. When introduced into a wet mix, moisture absorption is accompanied by an increase in volume or a swelling of the solid material, but such a volume increase or swelling is largely taken up by the pores of the sponge-like mass. Therefore absorption of moisture and conversion of the mass takes place without substantial change in overall volume occupied by the product.

The relatively smooth, unbroken skin 18 of each expanded mass plays a part in the mechanism of moisture absorption and conversion to a gel. It tends to prevent rapid dispersion of moisture into the pores of the mass with resulting deterioration of the mechanical structure, without affording an adequate working time. Furthermore, due to the character of this surface and its effect in controlling moisture absorption, the converted gel-like masses tend to have the same general form as the original masses. In other words, distribution of water from an outer moist mix into the interior of the masses is controlled, whereby absorption and initial conversion to gel-like form takes place concomitantly with hydration of the sponge-like structure. As a result, the conversion to gel takes place without any substantial change in overall volume. In actual practice, where the product is incorporated in a dough or wet cake batter, and then subjected to a baking or cooking temperature, moisture absorption into the interior is retarded by the outer skin to provide adequate working time for such operations as mixing and depositing, and for proofing and fermentation when these steps are employed. During this working time the product retains sufficient mechanical strength whereby it remains substantially intact without crushing or breakage. Hydration and conversion to gel-like form is completed during baking and after such working time.

Assuming that the mix being used contains pregelatinized starch, at least a part of the starch removed in operation 13 can be employed as stabilizer in the mix. So-called redried starch having a low moisture content of from 4 to 5% has been found preferable. Its use promotes optimum expansion and rounding of the masses.

In the foregoing, reference is made to freezing or chilling in step 8. After subdividing, and concomitant with subsequent handling preparatory to vacuumizing, the defrosting fragments tend to accumulate surface moisture. This is deemed desirable because it improves the skin of the expanded masses, particularly in that the skin is made thicker and more impervious. Thus the thickness of the skin and its increased imperviousness is, in part, achieved through defrosting of chilled products, whereby the exposed area is surfaced with moisture that melts the surface just enough to create an improved skin structure for the final product after dehydration. Defrosting or warming of the chilled fragments can be carried out in an atmosphere of humidified air of controlled relative humidity, to obtain an optimum amount of surface moisture.

The product described above can be incorporated to advantage in a wide variety of bakery products and confections. For example, as applied to cakes, a suitable quantity of the product can be stirred into the wet cake mix, prior to introducing the mix into a baking pan. Moisture absorption in each of the masses serves to convert it into a gel-like mass of substantially the same volume, whereby in the finished cake, such masses are well defined islands of the gel. When used with cup-cake and pancake mixes, masses tend to rise to the surface of the batter and to be visible through the top surfaces of the finished cakes, thereby lending an enhanced attractiveness. As applied to candy, cake icing or frosting and other confections, the product can be incorporated in moist confection mixes with the same results as previously described. Also the product is applicable to frozen confections and desserts, such as ice cream, sherbets and the like. Here the product can be intermixed with the other ingredients of the confection, before or after freezing. Also it can be introduced into such products as cottage cheese, or processed or cream cheese, or like dairy products.

One bakery product to which my expanded masses are particularly applicable is drop cookies of the wire cut type. When incorporated in the cookie batter, the skin of the masses tends to retard penetration of water during such working operations as mixing and depositing. Therefore, during such operations, the masses are not hydrated to such an extent as to cause dispersion, and they remain substantially in tact with considerable mechanical strength. The size of the particles is such that they pass through the depositing rollers ordinarily employed without substantial cracking or crushing. Cracking or crushing during such preliminary operations would be detrimental because it would cause exposure of the porous interior to the moisture and thus result in rapid premature hydration and loss of identity as to form. The presence of the masses in the batter does not interfere with such operations as extrusion or wire cutting. This is due in part to the fact that the rounded surface contour of the masses causes them to be pushed aside to permit passage of the cutting wire instead of hanging upon the wire and being dragged through the batter and "chawing" the cookies. If an extended mass should be in the way of the cutting bar and is not pushed aside, a clean break is made which again does not interfere with the cutting operation.

During the preliminary cooking or baking stages of drop cookies as described above, hydration of the masses of my product is completed whereby discoloration or burning of exposed surfaces of the masses is prevented. The same characteristic prevents burning or discoloring by contact with the surfaces of the hot metal pan employed. Without relatively complete hydration of the masses after the preliminary phases of the baking, exposed surfaces would be discolored and burned, and contact with the hot surfaces of the pan would cause carmelization of the sugar and burning.

In addition to use in the type of cookies described above, my product can be used in cookies formed by rotary or die stamping machines, bar goods, and for so-called hand bag cookies. After baking cookies of the bar goods type, "guillotine" or other cutting devices can be used to reduce the baked masses to smaller sizes. The hydrated and gel-like particles are readily cut without injury to the knife.

As is well known to those familiar with various bakery products, cookies may vary with respect to the moisture content remaining in the final baked product. Where cookies are soft and moist, there will be such hydration of the expanded masses as to form a tender gel-like material. However, where the cookies are baked to crispness with substantially less moisture content, the masses may be only partially hydrated, in which event they have a crunchiness that is in keeping with the general character of the product.

Dependent upon the flavoring used in making my product, more or less loss of flavor may occur in operation 13 due to application of a partial vacuum. Therefore, while the masses produced as described above can be used without further modification, it is desirable in some instances to heighten the flavor and aromatic properties. I have found that this can be done by applying a suitable artificial flavoring extract or concentrate in liquid form to the outer surface of the masses. For example, various flavoring extracts such as citrus oil can be sprayed upon the exterior surfaces of the product, after being separated out from the starch in operation 14.

A thin surface film of solid fat is desirable on the product, to make it more resistant to atmospheric moisture and to impart an attractive sheen. Also such a coating serves to stabilize the aromatic constituents of the flavoring, and it aids in retarding penetration of moisture through the skin, when further retarding action is desired. For this purpose I can employ an edible fat having a melting point of 110° F., or higher. As examples of such fats, reference can be made to edible hydrogenated oils, such as hydrogenated cotton seed and soya oil, with or without antioxidants such as are commonly used with fats. The fat may be modified by additions of lecithin or monoglycerides. The Aratex mentioned in Example 2 is a compounded fat which gives good results.

A coating film of an edible high melting point fat is particularly desirable when the product is incorporated in bread. Without such a coating some breakdown of the masses when incorporated in a moist dough may take place, thereby serving to release acids (e.g. fruit acids) tending to retard leavening. The fat coating retards penetration of moisture through the exposed surface areas, thus delaying hydration of the masses until leavening action is substantially completed.

Instead of a coating of fat, it is possible to use other types of edible coating materials, such as beeswax, zein or like alcohol soluble coating materials.

Reference has been made to the use of flavoring material such as fresh fruit or berries in the form of a pulp or a juice, artificial flavoring materials, or both. Instead of or with such dispersed flavoring, I can incorporate fragments of fruit or like materials, which remain identifiable as such in the final product. Assuming the use of a fruit (e.g. apples, pears, peaches, apricots, etc.) preferably it is predried by conventional methods to make the flesh firm, and then subdivided into fragments of a size somewhat smaller than the average size of the final product. As an alternative to the use of a predried material, fruit (e.g. cherries, citrus peel, pineapple, etc.), may be candied by conventional methods to reduce its moisture content and to provide a substantial content of sugar (e.g. sucrose). Such candied material is likewise reduced to fragments of proper size. By way of example, the size of the fragments (predried or candied) may be such that the bulk of the divided material remains upon a No. 12 screen and passes through a No. 4 screen. Such fragments are then introduced and intermixed with the concentrated material from step 6, before sheeting.

By use of the procedure just described, fragments of predried candied fruit and the like are incorporated in a light weight medium whereby they are suspended when the product is incorporated in wet cake masses, batters and the like. In place of such predried or candied fragments, I may use other candy like flavored fragments which are of such a character that they do not melt when added to the syrup concentrate, such as fragments of the "gum drop" type. If desired two or more of such materials can be intermixed with the expandable material.

In some instances it has been found desirable to produce fragments for expanding in step 9, by producing hard or brittle masses from two separately processed materials, one of which is of such a character that it is particularly susceptible to expansion, and the second being such that it does tend to expand, or expands only to a limited extent. Thus, corn syrup can be concentrated by evaporation to produce a concentrate containing, say, 95% solids. This concentrate is formed into sheets, the sheets cooled (e.g. to 60° F. or lower) to make them brittle, and thereafter the sheets comminuted to produce a granular or coarse powder. The second material, which may contain sugar other than a reducing sugar and natural or artificial flavoring ingredients, is separately concentrated. Thereafter the concentrate is formed into sheets, the sheets cooled (e.g. to 60° F. or lower) to make them brittle, and the brittle material ground to form a granular divided material or coarse powder. The two coarse powders are then homogeneously intermixed while at a temperature level (e.g. 60° F. or lower) such that the individual particles do not tend to cling together. Thereafter the temperature of the mix is raised to cause the particles to become sufficiently sticky to adhere to each other and the material rolled to form composite sheets comprising the fragments adhered together. These composite sheets are then chilled to make them brittle, after which they are reduced to fragments in accordance with step 9 of FIGURE 1. The remaining steps are then applied as described with reference to FIGURE 1. In the separating operation, expansion occurs primarily with respect to my corn syrup particles.

Assuming that the method is carried out as just described, expansion of the corn syrup particles is not inhibited by the presence of other material containing the flavoring constituents. The material containing flavoring constituents may, for example, be a fruit or berry jam, the sugar content of which is such that it is not readily susceptible to expansion. Also it may be a candy-like material such as material of the "gum drop" type. Instead of forming the fragments into sheets, the mixture may be directly molded in forms of suitable size, and these forms processed for expansion. Adjustment of the moisture content of, say, the second material may be such as to aid in imparting surface stickiness, when the temperature level is increased from the temperature level (of the second material) at the time the second material is reduced to fragments from sheet forms.

In the formation of composite sheets of fragments as described above, the second fragments may be made of a substance other than dehydrated or candied fruit, candy-like material, etc. Thus a bakery product like crumbled cookies can be employed or a similar edible material which will not fuse or melt but will retain its identity during the expansion step. In such event the divided medium to be expanded can be corn sugar concentrate having a moisture content of the order of 16%, while the cookie crumbles may have a moisture content varying from 1 to 20%.

Certain features of my invention can be used to advantage in the manufacture of novel "bubble gum" products. Thus commercial chewing gums such as sapodilla tree sap, and substitute gums such as lechi capsi and jelutong, or suitable synthetic resins, can be introduced into the product in suitable proportions, and the processing carried out to produce an expanded product of the desired shape and size. The gum base can be homogeneously incorporated with all or a part of the reducing sugar content. Also it is possible to incorporate the gum base in a powdered non-expandable sugar material, which is thereafter intermixed with another powdered material capable of expansion. The mixture of powdered materials is formed into masses of suitable size and shape for expansion.

Previous reference has been made to the formation of generally spherical shaped expanded masses. It should be understood that the shaping of the masses is affected somewhat by the shaping of the material just prior to the vacuum treatment. For example, by forming the material before expansion as flattened fragments or forms, the expanded product will be in the form of flattened spheres or pebbles.

The following examples are illustrations of specific formulas and procedures:

*Example 1*

Forty-five pounds of fresh frozen blueberries were defrosted and comminuted in a suitable hammer mill, such as one of the Reitz type. The comminuted material or pulp was placed in a suitable high speed mixer at a temperature of about 170° F., and 25 ounces (by weight) of low methoxyl pectin (Exchange Pectin #466) introduced and dissolved therein. This material was then introduced into a vacuum evaporator and intermixed with added corn syrup and citric acid. Sixty-nine (69) pounds of commercial corn syrup was employed (refractometer reading about 80), and 2½ ounces (by volume) of citric acid. In the evaporating operation 6, the mix was heated to a temperature level of about 150° F. and the vacuum applied ranged from about 26 to 28 (mercury column). Concentration was continued until the material contained about 85% solids. This concentrate was then subjected to sheeting with application of starch to prevent sticking to the surface of the rolls. The sheets produced measured ¼ inch in thickness. They were chilled to a temperature level of about 50° F. by placing them in a refrigerated atmosphere. Thereafter the sheets were supplied to a mill of the Fitzpatrick type which reduced the sheets to fragments, whereafter the fragments were subjected to sizing with removal of a small amount of undersized material passing through a No. 10 screen, and with removal and recrushing or recutting of oversized fragments remaining on a No. 3 screen. The fragments were then intermixed with dry powdered starch, in equal proportions (by weight). This mix was then introduced into trays to produce layers about 1½ inches in thickness. The trays were then placed in a vacuum dehydrator, where the trays were heated to a temperature level of 180° F., and a vacuum applied corresponded to 28 inches mercury column. After remaining in the vacuum dehydrator for about two hours, the trays were removed and the expanded product separated from the starch by screening.

The product made in accordance with the foregoing Example 1 was generally in the form described with reference to FIGURES 3 and 4, and had a bulk density of about 415 grams per liter. The moisture content was about 3%. It had the desirable characteristics previously described, including sufficient inherent strength to enable mechanical intermixing with various wet mixes, such as cookie, pancake and dough mixes without mechanical disintegration. With certain mixes like foam cake and yeast raised goods, the product may be incorporated into the batter just prior to the final mixing stage. In the finished baked products made by use of my product, islands of gel-like masses were formed, directly identifiable with the original dry masses.

As previously explained, the gel-forming ability of low methoxyl pectin as used in Example 1 is partially dependent upon contact with a calcium ion in the wet mix. However, the calcium sensitivity of the low methoxyl pectin is such that relatively small amounts of calcium ion suffice to activate the pectin, the time factor involved being such that setting takes place substantially in conjunction with hydration and baking.

*Example 2*

Ingredients were used in proportions as follows.

| Ingredients: | Percentage |
| --- | --- |
| Corn syrup (commercial) | 48.8627 |
| Malt syrup (commercial) | 7.3294 |
| Water packed cherries (commercial canned) | 2.5304 |
| Edible color—Red #2 | .0161 |
| Edible color—Red #4 | .0161 |
| Sodium caseinate | 2.7573 |
| Coconut cellulose (defatted) | 5.4796 |
| Non-fat dry milk solids | 18.3235 |
| Pregelatinized starch | 14.6588 |
| Flavor—wild cherry | .0261 |
| | 100.0000 |

The same procedure was followed as in Example 1 to produce a cherry-flavored product.

*Example 3*

Ingredients were used in proportions as follows.

| Ingredients: | Percentage by weight |
| --- | --- |
| Corn syrup (commercial) | 48.7351 |
| Malt syrup (commercial) | 7.3103 |
| Concentrated lemon juice | 2.4368 |
| Color—lemon yellow | 0.0429 |
| Citric acid | 0.1523 |
| Sodium caseinate | 2.7414 |
| Coconut cellulose (defatted) | 5.4827 |
| Non-fat dry milk solids | 18.2751 |
| Pregelatinized starch | 14.6206 |
| Flavor—imitation lemon oil, 1½ oz., Fritzsche Brothers | 0.2023 |
| | 100.0000 |

The same procedure was followed as in Example 1 to produce a lemon-flavored product.

*Example 4*

Ingredients were used in proportions as follows.

Ingredients:
 18 lbs. ground blueberries
 5 lbs. 13 oz. corn syrup (commercial)

The above ingredients were mixed and concentrated by evaporation to 85 refractometer reading. Thereafter 1 lb. 3 oz. of powdered sugar (sucrose) was added and homogeneously intermixed. This material was then sheeted and subjected to the further treatment steps as set forth in Example 1. The natural pectin content of the blueberries provided a gel forming agent.

*Example 5*

A mixture was prepared from ingredients as follows:

12 pounds corn syrup
3 pounds malt syrup
10 grams of artificial yellow coloring
7/10 gram of artificial red coloring
1½ pounds of coconut stabilizer
4 pounds powdered skim milk
3 pounds pregelatinized starch (Instant Starch P-23 made by National Starch Company)
4 pounds malted milk (powdered)

The corn syrup, malt syrup and artificial coloring were mixed and boiled to concentrate the same to about 87% solids. The coconut, powdered milk, starch and the malted milk were preheated to about 130° F. and then added. Homogeneous material was then formed into a slab and chilled to 40° F. The hard brittle and non-sticky slab was cracked to reduce it to fragments passing through a No. 5 screen and remaining on a No. 12 screen. Ten parts of such fragments (by weight) were mixed with twenty parts corn starch and this mixture placed in pans to produce a layer of about 1½ inches deep. The pans were placed upon shelves of a vacuum dehydrator, heated by water at a temperature of about 170° F., whereby the pans and contents were heated to a temperature level of about 165° F. A vacuum equal to 27 inches mercury column was applied and maintained for two hours. After vacuumizing the starch was removed through a No. 12 screen and the remaining masses sprayed with citrus oil comprising four ounces of lemon oil and one pound of orange oil, and permitted to set for 48 hours. Thereafter the masses were sprayed with a high melting point edible fat (Aratex). The citrus oils served to heighten the flavor and impart a fruity odor. Application of the high melting point wax imparted a sheen to the surfaces of the masses. In addition it served to minimize penetration of atmospheric moisture, to stabilize the citrus oil and to retard hydration as previously described.

*Example 6*

A wet mix was prepared from ingredients as follows:

12 lbs. corn syrup
2 lbs. malt syrup
4 lbs. milled blueberries
8 gms. artificial grape coloring
4/10 gm. artificial red coloring
9/10 gm. blue coloring
1½ lbs. coconut stabilizer
4 lbs. powdered skim milk
3 lbs. pre-gelatinized starch
¾ oz. artificial blueberry flavoring
4 lbs. malted milk powder The corn syrup, malt syrup, milled blueberries and artificial coloring were first mixed, boiled, and concentrated to about 87% solids. The coconut, powdered milk, starch, malted milk powder were preheated to about 140° F., and together with the flavoring worked in to form a homogeneous material having a solids content between 90 and 98%. This material was formed into slabs about 3/16 inch thick, chilled to 0° F., and then cracked to form fragments. Undersized fragments passing through a No. 12 screen (American Standard), and oversize fragments remaining on a No. 6 screen, were removed. One part (by weight) of these fragments was intermixed with 10 parts of cornstarch, and this mixture introduced into trays to form layers about 1 inch deep. The trays were then placed upon the shelves of a vacuum dehydrator, the shelves being heated by water at 170° F., whereby the contents of the trays were heated to about 160° F. After initial heating, vacuum was applied corresponding to 27 inches mercury column, and the vacuum maintained for a period ranging from one half (½) to one and one half (1½) hours. After removal from the vacuum chamber the material was subjected to screening to remove the expanded masses from the starch. The expanded masses had smooth exterior surfaces, the interior of each mass was completely filled with a porous sponge-like structure, and the average diameter of the major part of the expanded masses ranged from about ⅛ to ⅜ inch.

*Example 7*

A wet mix was prepared from ingredients as follows:

12 lbs. corn syrup
2 lbs. malt syrup
12 gms. artificial yellow coloring
7/10 gm. artificial red coloring
8 ozs. dried egg albumen
1 lb. water for dissolving the albumen
1¼ lbs. coconut stabilizer
4 lbs. powdered skim milk
4 lbs. malted milk powder
4 lbs. pre-gelatinized starch The corn syrup, malt syrup and coloring were mixed and concentrated in a vacuum cooker to about 75% solids. The vacuum was removed and the product further heated at atmospheric pressure to about 180° F. to produce a concentrate of from 75% to 80% solids. The egg albumen was dispersed in the water and heated to 120° F. The albumen dispersion together with the above concentrate were intermixed and whipped by mechanical beating to provide an overrun of about 200%. The coconut stabilizer, malted milk powder, powdered skim milk and starch were then added to the whipped material to provide a solids content of about 90%. This material was rolled into sheets while warm and then chilled to 0° F. Thereafter it was cracked and sized as in Example 5. The resulting fragments were mixed with equal parts of re-dried starch and this mixture introduced into trays to form layers about 1 inch deep. The trays were placed upon the shelves of a vacuum dehydrator, the shelves being heated by water to a temperature of 160° F. After initial heating vacuum was applied corresponding to 29 inches mercury column, and the vacuum maintained for two hours. After removal from the vacuum chamber the material was subjected to screening to remove the expanded masses from the starch. The expanded masses had smooth exterior surfaces, the interior of each mass was completely filled with a porous sponge-like structure, and the average diameter of the major part of the expanded masses ranged from about ⅛ to ⅜ inch.

The egg albumen used in the foregoing Example 6 tended to increase the expansion of the fragments in the vacuumizing treatment. This in turn tended to provide a more tender product, particularly suited for use in cookies.

*Example 8*

A wet mix was prepared from ingredients as follows:

12 lbs. corn syrup
2 lbs. malt syrup
4 lbs. gum arabic
4 lbs. water for dissolving the gum arabic
1 lb. concentrated orange juice
12 gms. artificial yellow coloring
7/10 gm. artificial red coloring.
4 lbs. powdered skim milk
4 lbs. powdered malted milk
3 lbs. pre-gelatinized starch The gum arabic was dissolved in the water and then filtered through cheese cloth. This solution was added to the corn syrup and the malt syrup, and this mixture was heated to 212° F. The orange juice concentrate was then added and the material concentrated in a vacuum to about 85% solids. The powdered skim milk, malted milk powder and powdered starch were then added to the concentrate. The resulting material was sheeted, chilled, cracked and expanded in the same manner as described in Example 6.

*Example 9*

As a variation to Example 8, the 85% solids concentrate was mixed with 8 ounces of dried egg albumen dissolved in one part of water and the resulting mix mechanically beaten to provide about 200% overrun. This was intermixed with the remaining ingredients, namely, the stabilizer, powdered milk, malted milk and starch.

With the use of a whipping agent, the concentrate of Example 8 comprising the gum arabic, corn syrup and malt syrup may contain a lower percentage of solids, as for example about 80%, because the whipping agent tends to cause the material to maintain its physical identity during vacuumizing.

In all of the foregoing examples, the resulting product has a size and form determined by various factors in the process, including the size of the fragments produced in steps 9 and 10, and the extent of the expansion in step 13. The flavoring is derived from natural fruit and berry juices and pulps, or from artificial flavoring constituents or both.

*Example 10*

Apricots were predried by conventional dehydration to produce dehydrated fruit containing about 14% moisture. They were then subdivided to fragments whereby the bulk of the material remained upon a No. 12 screen, but passed through a No. 4 screen. Seventy-five pounds of commercial corn syrup, together with 23 ounces of low methoxyl pectin, were evaporated to produce a concentrate containing about 90% solids. Twenty-five pounds of the dehydrated fruit fragments were introduced and intermixed with this concentrate, and the concentrate then sheeted to produce sheets measuring ¼ inch in thickness. Thereafter the sheets were cooled and reduced to fragments, and the fragments processed, all as in Example 1. The final product obtained in this manner was generally in the form described with reference to FIGURES 3 and 4. Each of the masses contained dehydrated fruit fragments which were readily identifiable as such.

*Example 11*

Seventy-five pounds of commercial corn syrup, together with about 23 ounces (by weight) of low methoxyl pectin, were evaporated to produce a concentrate containing about 90% solids. This concentrate was then formed into sheets measuring about ¼ inch in thickness, and the sheets cooled to about 40° F. to make them hard and brittle. Thereafter the sheets were cracked to form a granular or coarse powder. A conventional blueberry jam, made from fresh blueberreis and sugar (sucrose) was concentrated to about 90% solids, and then formed into sheets measuring about ¼ inch thickness. These sheets were cooled to about 40° F. to make them hard and brittle, and the brittle sheets ground to a granular or coarse powder. The powder comprising corn sugar was homogeneously intermixed with powder formed from the blueberry jam in proportions corresponding to one part (by weight) of corn sugar powder to one part of blueberry jam powder. The temperature of the mixture was raised to about 90° F., at which temperature level the particles of powder became somewhat sticky. A layer of this material was rolled to compress the particles together and thus form a composite sheet measuring about ¼ inch in thickness. These sheets were again cooled to about 40° F. to make them hard and brittle, and then reduced to fragments, and the fragments processed, all in the manner set forth in Example 1. The final product obtained in this manner was generally in the same form as that described with reference to FIGURES 3 and 4. The cellular structure of each of the masses was formed from the corn syrup powder particles. The particles of concentrated jam remained as such and were dispersed relatively uniformly throughout the expanded masses.

As a variation of this Example 11 the mixture of powder materials, after warming may be pressed or molded into special forms, and these forms expanded without further subdivision.

*Example 12*

Forty pounds of commercial corn syrup was heated to 200° F. Fifteen pounds of chewing gum base (as obtained commercially) was broken into smaller pieces and introduced into the hot corn syrup, and thereafter the mixture stirred until the gum was completely dissolved. Color and flavoring ingredients may be added at this point. To this hot syrup there was added 40 pounds of powdered sugar (sucrose) and about 3 pounds of powdered beeswax. These ingredients were intermixed with the syrup until the mass was homogeneous. The hot material was then poured out upon a cooling plate or slab that had been dusted with powdered sugar. The resulting sheet of material, while warm, was cut into squares to form fragments about ¼ inch in diameter for further treatment. These fragments were intermixed with dry powdered starch in equal proportions (by weight) and the mixture introduced into trays to produce layers about ¾ inch in thickness. The trays are then placed in a vacuum dehydrator where they were heated to a temperature level of about 150° F., and a vacuum applied corresponding to 29 inches mercury column. After remaining in the vacuum dehydrator for about 2 hours with reduction in moisture content to about 5%, the hot water circulated through the shelves was replaced with water at about 65° F. This served to cool and solidify the expanded masses, thus retaining an optimum degree of expansion. After about 1 hour of such cooling, the trays were removed and the expanded masses separated from the starch by screening.

The product made in accordance with the foregoing Example 12 had all of the chewing characteristics of commercial "bubble gum" products. However, the bulk density of the product was relatively low, due to the expansion. The beeswax content was used to facilitate cutting to fragments of desired size. Instead of beeswax, other ingredients can be used such as stearin. Instead of cutting the material to form fragments of desired size, other expedients can be used for this purpose, such as conventional roll type devices employed in the manufacture of chewing gum.

*Example 13*

5 pounds of commercial chewing gum base in powdered form was mixed with 15 pounds of granulated sugar (sucrose) together with 4 pounds of water, to form a paste. This paste was then heated and concentrated by evaporation to form a homogeneous material containing about 95% solids. This concentrate was poured upon a slab and the resulting sheet, after chilling, was comminuted to form a granular material. The granular material was then intermixed with an equal part of a granular powder consisting primarily of corn sugar, and prepared like the granular material in Example 11, except that pectin was omitted. This mixture was then warmed to cause some stickiness of the particles after which it was compressed or moulded into masses of convenient size for expansion. These masses were then further treated in the same manner as the particles of Example 12.

This application is a continuation-in-part of my co-pending application Serial No. 659,517, filed May 16, 1957, and entitled Food Product and Method of Manufacture, now abandoned.

I claim:

1. As a new article of manufacture, small dry masses each having an outer surface tending to retard penetration of moisture and an inner porous sponge-like interior, the masses containing reducing sugar and a gel-forming agent.

2. An article of manufacture as in claim 1 in which the gel-forming agent is low methoxyl pectin.

3. As a new article of manufacture, small dry generally spherical shaped masses each having a porous sponge-like interior and a smooth substantially unbroken outer surface, the masses comprising edible ingredients including reducing sugar and a gel-forming agent, such masses being characterized by their ability when incorporated in moist food mixes to withstand mixing without physical disintegration and to absorb moisture to form solid edible gel-like masses having substantially the same size as the original dry masses.

4. An article of manufacture as in claim 3 in which the gel-forming agent is a low methoxyl peutin.

5. An article of manufacture as in claim 3 in which the gel-forming agent is natural pectin contained in one of the edible ingredients.

6. An article of manufacture as in claim 3 in which the gel-forming agent is a moisture absorbent stabilizer.

7. A new article of manufacture as in claim 3 in which each mass has a supplemental flavoring ingredient applied to its outer surface.

8. An article of manufacture as in claim 3 in which each mass has an edible protective film on its outer surface.

9. An article of manufacture as in claim 3 in which each mass has an added flavoring ingredient on its outer surface and also a film of high melting point edible fat.

10. An article of manufacture as in claim 3 in which the major ingredients comprise reducing sugar and low methoxyl pectin as a gel-forming agent.

11. As a new article of manufacture, small generally spherical shaped masses each having a porous sponge-like interior and a smooth substantially unbroken outer surface, the masses comprising edible ingredients including reducing sugar and a gel-forming agent, the average diameter of the masses ranging mainly from about ⅛ to ⅜ inch, the masses being characterized by their ability when incorporated in moist food mixes to absorb moisture to form stable and separately identifiable solid edible gel-like masses having substantially the same size as the original dry masses.

12. In a method for the manufacture of a food product, forming a mass comprising concentrated reducing sugar and a gel-forming agent, and then subjecting the masses to a vacuum at an elevated temperature to expand the same.

13. A method as in claim 12 in which the mass comprises a flavoring ingredient and is obtained by subdividing a larger concentrate mass.

14. A method as in claim 12 in which the mass comprises the flesh of a natural fruit-like material in which the reducing sugar is dispersed.

15. In a method for the manufacture of a food product, the steps of forming a concentrate comprising a reducing sugar capable of imparting the property of expansion when the concentrate is subjected to a vacuum at an elevated temperature, together with a gel-forming agent, dividing the concentrate into small fragments, and then subjecting the fragments to a vacuum to cause expansion of the same, whereby the expanded fragments assume the form of smooth surfaced bubble-like masses having sponge-like interiors.

16. A method for the manufacture of a food product comprising the steps of forming a concentrate containing a mixture of ingredients including a gel-forming agent and reducing sugar capable of imparting the property of expansion when the concentrate is subjected to a vacuum at an elevated temperature, dividing the concentrate into small fragments, submerging said fragments in a dry divided separating and supporting medium, subjecting the fragments while in said medium to an elevated temperature and vacuum whereby the fragments are expanded and dehydrated in said medium to form generally spherical shaped masses having smooth exterior surfaces and sponge-like interiors, and then separating the expanded masses from said medium.

17. A method for the manufacture of a food product comprising the steps of forming a concentrate comprising a gel-forming agent and a reducing sugar capable of imparting the property of expansion into a sponge-like mass when subjected to a vacuum at an elevated temperature, cooling the concentrate to harden the same, whereby the resulting mass is brittle and nonsticky, subdividing the brittle mass into small fragments, sizing the fragments to remove oversized and undersized material, and then heating the fragments to an elevated temperature and subjecting them to a vacuum to cause expansion in volume to thereby form generally spherical shaped masses having smooth exterior surfaces and sponge-like interiors.

18. A method as in claim 17 in which the fragments are imbedded in a dry separating and supporting medium during application of the vacuum.

19. A method as in claim 17 in which the concentrate is chilled and in which moisture accumulates upon the surfaces of the thawing fragments before the fragments are subjected to an elevated temperature and vacuum.

20. A method as in claim 17 in which the supporting medium is dry powdered starch.

21. In a method for the manufacture of a food product, forming a wet mix of ingredients, introducing into the wet mix small masses each comprising reducing sugar and a gel-forming agent, said masses each having a smooth exterior and a sponge-like interior, and after such mixing causing the masses to be converted into solid gel-like masses of substantially the same volume, by moisture absorption.

22. A method as in claim 21 in which the gel-forming agent is low methoxyl pectin, and in which the wet mix contains calcium ion.

23. A method as in claim 21 in which the wet mix is a bakery mix and in which masses are introduced before baking the same.

24. A method as in claim 21 in which the moist mix is a confection.

25. A method as in claim 21 in which the moist mix is a frozen confection.

26. A method as in claim 21 in which the moist mix is a cheese.

27. As a new article of manufacture, small generally spherical shaped masses each having a porous sponge-like interior and a relatively smooth outer surface, the masses comprising edible ingredients, including reducing sugar and a gel-forming agent, the masses also containing identifiable particles of expanded edible material dispersed therein.

28. A method for the manufacture of a food product comprising the steps of forming a concentrate comprising a gel-forming agent and a reducing sugar capable of imparting the property of expansion into a sponge-like mass when subjected to a vacuum at an elevated temperature, cooling the concentrate to harden the same, subdividing the hardened concentrate to form a coarse powder, mixing the coarse powder with a second relatively non-expandable coarse powder material, forming the mixture into masses with the powder particles adhered together, and then heating the masses to an elevated temperature and subjecting them to a vacuum to cause expansion in volume to thereby form masses having sponge-like interiors.

29. A method as in claim 28 in which the second material is not expanded to a substantial extent during vacuum treatment and in which fragments of the second material are identifiable in the final product.

30. A method as in claim 26 in which the mixture of powdered materials is compressed and thereafter chilled and broken into fragments.

31. As a new article of manufacture, an expanded mass having a porous sponge-like interior, the masses containing reducing sugar and a chewing gum base.

References Cited in the file of this patent

UNITED STATES PATENTS

| | | |
|---|---|---|
| 36,816 | Wiesecke | Oct. 28, 1862 |
| 1,327,113 | Overbeck | Jan. 6, 1920 |
| 1,374,160 | Fowler | Apr. 5, 1921 |
| 1,851,988 | Scott | Apr. 5, 1932 |
| 2,328,554 | Heyman | Sept. 7, 1943 |
| 2,650,881 | Forkner | Sept. 1, 1953 |